United States Patent [19]

Kato et al.

[11] Patent Number: 5,390,052

[45] Date of Patent: Feb. 14, 1995

[54] METHOD OF RECORDING/REPRODUCING TABLE OF CONTENTS IN DIGITAL MAGNETIC TAPE RECORDING/REPRODUCING APPARATUS

[75] Inventors: Hiroaki Kato; Yanabe Junji, both of Sanda, Japan

[73] Assignee: Mitsubishi Denki Kabushiki Kaisha, Tokyo, Japan

[21] Appl. No.: 967,060

[22] Filed: Oct. 28, 1992

[51] Int. Cl.⁶ .................. G11B 5/00; G11B 5/09; G11B 5/76

[52] U.S. Cl. .................. 360/32; 360/48; 369/59

[58] Field of Search .......... 360/48, 46, 47, 67, 360/68, 69, 32, 8, 72.1; 363/47, 100, 32, 212; 364/200, 900

[56] References Cited

U.S. PATENT DOCUMENTS

| | | | |
|---|---|---|---|
| 4,117,542 | 9/1978 | Klausner et al. | 364/900 |
| 4,821,128 | 4/1989 | Inazawa et al. | 360/72.2 |
| 4,899,233 | 2/1990 | Yoshida | 360/77.14 |
| 4,985,697 | 1/1991 | Boulton | 340/750 |
| 5,038,231 | 8/1991 | Harigaya et al. | 360/68 |
| 5,138,600 | 8/1992 | Aayagi | 369/58 |
| 5,179,479 | 1/1993 | Ahn | 360/72.1 |
| 5,195,066 | 3/1993 | Amemiya et al. | 369/32 |
| 5,228,021 | 7/1993 | Sato et al. | 369/58 |
| 5,245,600 | 9/1993 | Yamauchi | 368/49 |

FOREIGN PATENT DOCUMENTS

| | | | |
|---|---|---|---|
| 231394 | 2/1990 | Japan | G11B 27/28 |
| 2130781 | 5/1990 | Japan | G11B 27/28 |
| 349684 | 5/1991 | Japan | G11B 27/28 |
| 3205676 | 9/1991 | Japan | G11B 27/28 |

*Primary Examiner*—Donald Hajec
*Assistant Examiner*—Le Thien Minh

[57] ABSTRACT

A method of recording/reproducing a table of contents in a digital magnetic tape apparatus, in which a head performs a helical scan of a magnetic tape to obtain tracks, each track including a PCM area for recording digital data and a subarea for recording subcode signals. In the recording, a reproduction skip signal is written in the subarea by a TOC button operation and a TOC signal is written in the PCM area of the tape itself as an audio signal. Also, a TOC code signal corresponding to the TOC signal is written in the subarea. When reproducing, the TOC code signal is stored in a program memory during the reproduction of the tape. A high speed search of program numbers or music titles and a data head position searching of the same are precisely performed.

36 Claims, 8 Drawing Sheets

METHOD OF RECORDING/REPRODUCING TABLE OF CONTENTS IN DIGITAL MAGNETIC TAPE RECORDING/REPRODUCING APPARATUS

BACKGROUND OF THE INVENTION i) Field of the Invention

The present invention relates to a method of recording and reproducing a table of contents in a digital magnetic tape recording and reproducing apparatus, and more particularly to an improved method for readily recording and reproducing contents of a program on a magnetic tape having a format constituted by a PCM (pulse code modulation) area for recording data and a subarea for recording subcode signals.

ii) Description of the Related Arts

Conventionally, an apparatus for recording digital data on predetermined tracks of a magnetic tape has been developed and, for example, is known as an R-DAT. This digital magnetic tape apparatus, different from a conventional analog recording system, has not only advantages such as small signal deterioration when recording and reproducing and a high recording density but also other advantages, for example, various follow-up recordings and a high speed search facility, a music selection and an editing facility, using a subarea can be readily carried out.

In the digital magnetic tape apparatus represented by the R-DAT, a helical scan system for slantingly scanning a rotary head with relation to a running magnetic tape is used. In such a helical scan system, straight long tracks slightly inclined with relation to the tape running direction are formed on the magnetic tape.

Further, in this helical scan system, the tracks possess a tape format constituted by a PCM (main) area, usually for recording digital data and a subarea for recording digital subcodes representing information or characteristics of the digital data. Thus, by continuously forming the tracks on the magnetic tape, a predetermined data recording operation can be carried out, and a data control can actually be performed using the subcode signals of the subareas of the tracks.

Accordingly, for example, when the data to be recorded are a plurality of pieces of music, a program number of each piece of music, a start code signal, a priority code signal and the like are recorded in the subareas of the necessary tracks.

In such a conventional digital magnetic tape apparatus, since the program numbers of the delimited data are consecutively written in the necessary subareas, by successively searching the program numbers, the necessary program numbers for certain pieces of music can be selected. Further, by cooperating with a program memory storing the recording order of the program numbers, a random high speed search of the program numbers is made possible.

However, in the conventional digital magnetic tape apparatus represented by the R-DAT, the Whole of a table of contents recorded on the magnetic tape can not be looked through. Normally, a user just writes down the table of contents of the data recorded in a separately prepared notebook or tape case card.

Further, recently, such a digital magnetic tape apparatus has become miniaturized for a portable type and has also been mounted in a automobile or the like. In such an apparatus mounted in an automobile, the need for carrying out an operation of the apparatus occurs during the driving of the automobile. Thus it is almost impossible to read the the aforementioned conventional notebook or card for a data selection or a music selection.

SUMMARY OF THE INVENTION

It is therefore an object of the present invention to provide an improved method of recording a table of contents in a digital magnetic tape recording and reproducing apparatus, which is capable of writing the table of contents on the magnetic tape itself using audio signals.

It is another object of the present invention to provide an improved method of reproducing a table of contents in a digital magnetic tape recording and reproducing apparatus, which is capable of reading the table of contents on the magnetic tape itself using audio signals.

In order to achieve the objects of the present invention, according to the present invention, in order to record a TOC (table of contents), a reproduction skip signal is written in a subarea by a TOC button operation, and a TOC signal is written in a PCM area on the consecutive tape from the writing of the reproduction skip signal by sound.

Further, according to the present invention, the TOC signal is written in the PCM area using audio signals, and a TOC code signal corresponding to this TOC signal is written in the subarea corresponding to the PCM area in which this TOC signal is written.

In the present invention, the TOC signal can be recorded in a remaining area obtained after the digital data are recorded on the magnetic tape.

Also, according to the present .invention, the TOC signal is written in the predetermined PCM area as an audio signal, and the TOC code signal is stored in a program memory by the operation of a memory button during reproduction of a magnetic tape part in which the TOC code signal corresponding to the TOC signal is written in the subarea corresponding to the PCM area in which the TOC signal is written.

Further, according to the present invention, the TOC signal is written in the predetermined PCM area as an audio signal, and a high speed search for a data area designated by the TOC code signal is performed by a search button operation. This starts reproduction of the searched data during reproduction of the magnetic tape part in which the TOC code signal corresponding to the TOC signal is written in the subarea corresponding to the PCM area in which the TOC signal is written.

In the present invention, the TOC signal is written in the predetermined PCM area as an audio signal, and a recording of a start code signal is stopped during the writing of the TOC signal in the PCM area.

Also, successive program numbers to be recorded in the subarea are reset by a TOC button operation, and the program numbers within a TOC recording area are recorded as a new successive number array.

Further, the TOC code signal is input by using numerical keys.

Hence, according to the present invention, the TOC signals can be recorded in the vacant area of the magnetic tape as an audio signal depending on the preference of the user. During the reproducing, the TOC signals are reproduced audibly so as to readily be able to understand its contents, and the necessary data, for example, the title of the music, can be extremely easily searched. Thus, the program numbers corresponding to the music titles are known, or the searching of the data head position or the music head position directly corresponding to the program numbers can be performed.

In particular, in a digital magnetic tape recording and reproducing apparatus mounted in an automobile, by the recording/reproducing of the TOC signals as audio signals, the operation of the apparatus can be made possible without obstructing the forward view of the driver, and thus it is extremely suitable for safe and comfortable driving.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
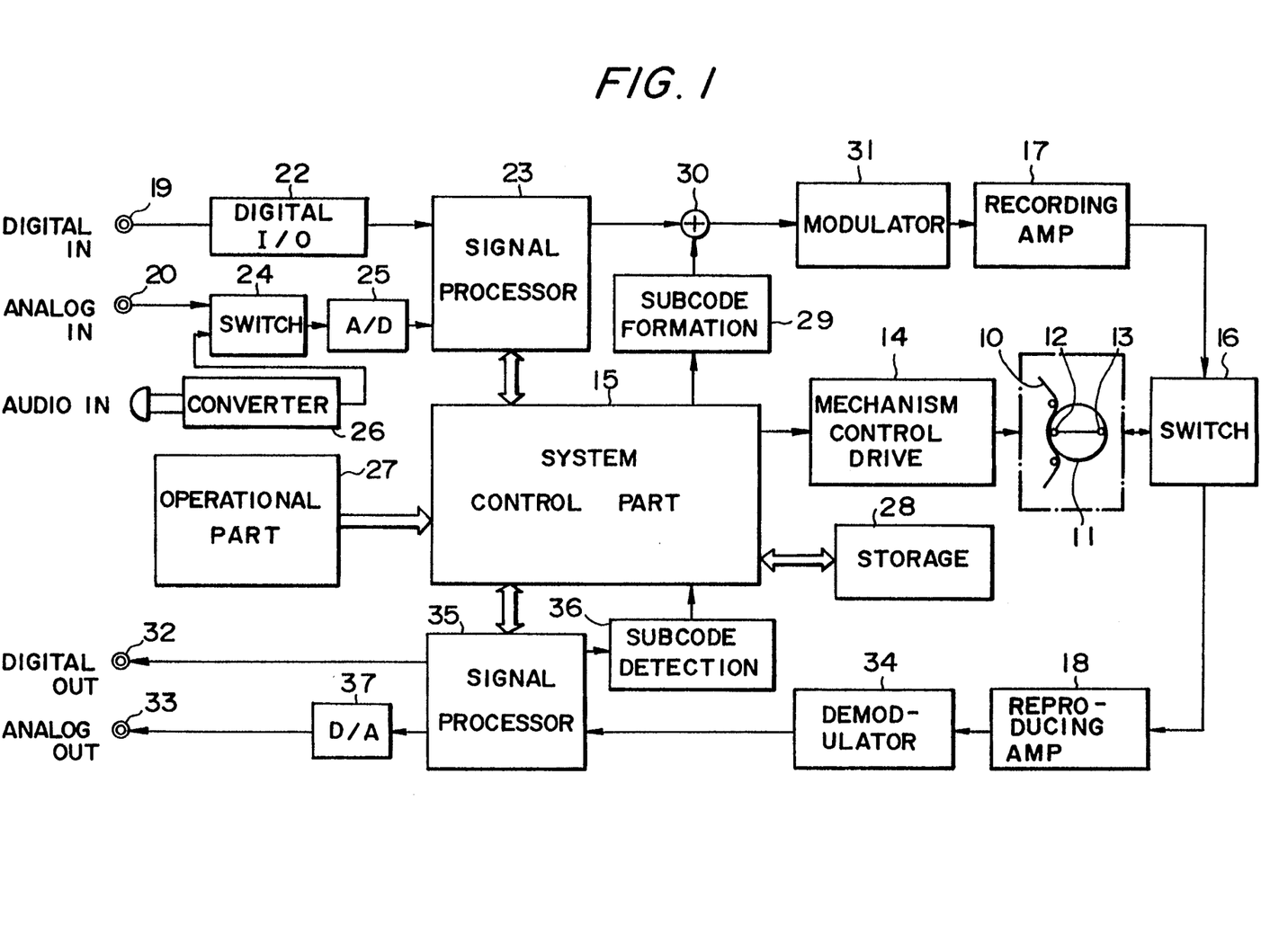
FIG. 1 is a block diagram of a digital magnetic tape recording and reproducing apparatus to which a method of recording and reproducing a table of contents according to the present invention is applied.

Referring now to the drawings, wherein like reference characters designate like or corresponding parts throughout the views and thus the repeated description thereof can be omitted for brevity, there is shown in FIG. 1 the entire construction of a digital magnetic tape recording and reproducing apparatus to which a method of recording and reproducing a table of contents according to the present invention is applied.

As shown in FIG. 1, a magnetic tape 10 is moved and controlled by a drive motor (not shown), and during the running of the magnetic tape 10, two read/write heads 12 and 13 carried on a rotary drum 11 perform a helical scanning of the magnetic tape 10 at a predetermined slant angle with relation to the running direction of the magnetic tape 10 so as to form tracks crossing the magnetic tape 10 at the predetermined angle. On the tracks, predetermined data are recorded by the two read/write heads 12 and 13.

For moving and carrying out a scan control of the magnetic tape 10 and the rotary drum 11, a mechanism control drive circuit 14 is provided. Further, and by a control signal output by a system control circuit 15, a mechanism control of the mechanism control drive circuit 14 is carried out corresponding to a predetermined mode such as a recording mode, a reproducing mode, a high speed search mode or the like. In order to control the recording and reproducing through the two read/write heads 12 and 13, a switch circuit 16 is provided. In a data recording mode, a digital recording signal output by a recording amplifier 17 is fed from the switch circuit 16 to the two read/write heads 12 and 13, and in a data reproducing mode, the digital reproducing signals sent by the two read/write heads 12 and 13 are output from the switch circuit 16 to a reproducing amplifier 18.

In the digital magnetic tape recording and reproducing apparatus, the recording data include three kinds of data such as digital data, analog data and audio input data input from digital and analog input terminals 19 and 20 and a microphone terminal 21, respectively. The digital data input from the input terminal 19 are supplied unmodified to a signal processor 23 controlled by the system control circuit 15 via an I/O part 22, and the analog data input from the input terminal 20 are fed to the signal processor 23 via a switch circuit 24 and an A/D (analog-digital) converter 25. The audio data input from the microphone terminal 21 are preprocessed in a converter 26 before being input to the switch circuit 24.

An operational part 27, is provided for operating the apparatus externally for actions such as power on and off, mode switching an necessary code input, and by a instruction sent from the operational part 27, the system control circuit 15 performs the desired operation. Further, the system control circuit 15 possesses storage 28 including a program memory and the like, in which program numbers hereinafter described and other data can be stored.

When the desired subcode instruction is given to the system control circuit 15 from the operational part 27, the system control circuit 15 functions to allow a subcode formation section 29 to feed a subcode signal to a synthesizer 30, and the synthesizer 30 synthesizes the subcode signal and the data input from the signal processor 23 to output a synthesized result to a modulator 31. Then, the modulator 31 carries out a predetermined modulation, for example, a PCM modulation operation. Hence, as described above, the data and the subcode signal are given from the recording amplifier 17 to the two read/write heads 12 and 13 and the digital recording is performed on the particular track of the magnetic tape 10.

On the other hand, in the digital magnetic tape recording and reproducing apparatus, two outputs such as a digital signal output and an analog signal output can be selected from respective output terminals 32 and 33 to output to an external speaker or the like. The reproducing circuit includes a demodulator 34 for demodulating the output of the reproducing amplifier 18, and the demodulator 34 outputs a demodulated signal to a signal processor 35 which is controlled by the system control circuit 15. In the signal processor 35, the data and the subcode signal are separated from each other and the separated subcode signal is output from the signal processor 35 to a subcode detection section 36. Using the subcode signal, the subcode detection part 36 can determine the desired control operation, for instance, a high speed search, a data head position search, a data reading preference level or the like. The demodulated data are output from the signal processor 35 to the output terminal 32 or 33 directly or via a D/A (digital-analog) converter part 37, and the desired reproducing operation is carried out externally.

Figure 2:
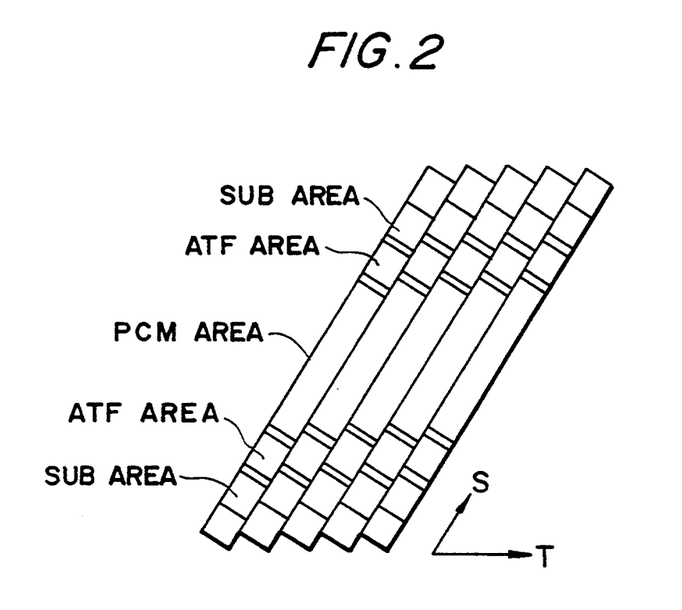
FIG. 2 is a schematic view showing a tape format of a helical scan system to be used in a method according to the present invention.

FIG. 2 illustrates one example of a tape track format used in the present invention, in which the head scans in the direction S with relation to the tape running direction T. As shown in FIG. 2, the tracks are arranged in parallel on the magnetic tape along a straight line at a predetermined slant angle with relation to its running direction, and as is well-known, the adjacent tracks have opposite azimuth angles (not shown in detail). Usually, two tracks constitute one frame. Each track includes a PCM area for recording digital data, a subarea for recording a digital subcode signal for representing information or characteristics of the digital data and an ATF (automatic tracking following) area for tracking, and these areas are allocated to predetermined data lengths.

According to the present invention, such a tape format is the same as the R-DAT, concerning the tape format. However, it is sufficient to include the PCM area and the subarea in each track. Thus it is not always required to use a format common to the usual R-DAT.

Figure 3:
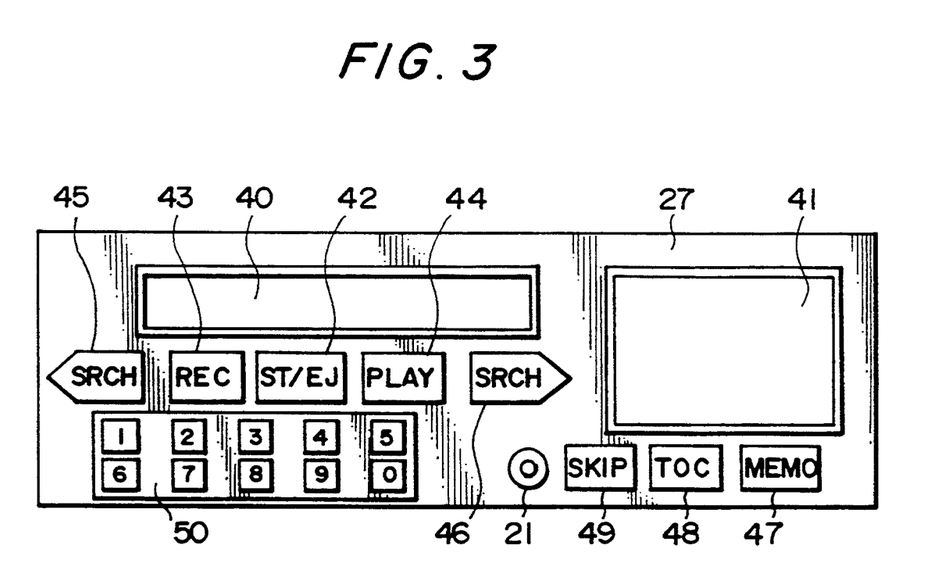
FIG. 3 is a front view of an operational part of the apparatus shown in FIG. 1.

FIG. 3 schematically shows the operational part 27 of the digital magnetic tape recording and reproducing apparatus shown in FIG. 1. The operational part 27 includes a magnetic tape cassette insertion slot 40 and a liquid crystal display 41 and further includes a plurality of buttons for switching power on and off and mode switching. These buttons include a stop/eject (ST/EJ) button 42, a recording (REC)button 43, a reproducing (PLAY) button 44, search (SRCH) buttons 45 and 46 and a memory (MEMO) button 47.

Further, as the distinctive feature of the present invention, as hereinafter described in detail, a TOC (table of contents) button 48 for writing a TOC signal is further included, and hence the TOC signal can be written on the magnetic tape itself as an audio signal such as any particular sound or voice.

As shown in FIG. 3, the operational part 27 also includes the microphone terminal 21, a skip button 49 and numerical keys 50.

Next, a method of recording and reproducing a table of contents according to the present invention will be further described in detail in connection with FIGS. 4 to 9.

Figure 4:
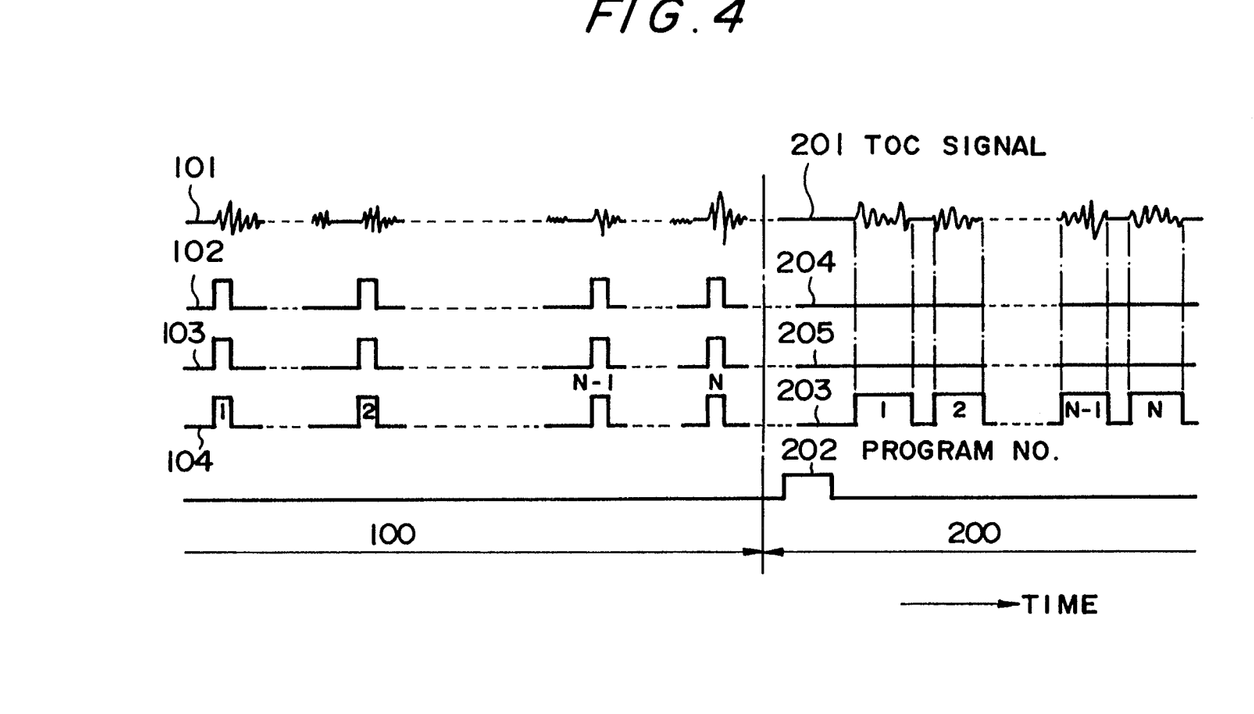
FIG. 4 is a timing chart showing a recording state of PCM areas and subareas for representing recording and reproducing systems of a method according to the present invention.

FIG. 4 shows a timing chart of data to be recorded in the PCM area and subcode signals to be recorded in the subarea.

In FIG. 4, an area 100 designates a conventional general data recording area and, for example, a plurality of pieces of music are successively recorded on the magnetic tape in the area 100. Data 101 to be recorded in the PCM area are shown by a continuous musical signal for each piece of music, and at the position of the beginning of each piece of music, a start code signal 102 and a preference level code signal 103 are recorded. Also, similarly, a program number 104 for representing each of a number of pieces of music in an array is stored in a predetermined part of the subarea.

These subcode signals 102, 103 and 104 are written in predetermined frames, for example, in the first 300 frames of each piece of music head portion, and even when there is a miss at any one part, by writing the same code signals in a plurality of frames, an exact search of the data in this head position can be performed at the reproducing time. Usually, within the system control circuit 15, only when the start code of the reproduced subcode signal is detected, the data head position search operation be allowed.

Further, the program numbers 104 are written in a predetermined order array such as an increasing number order or a reducing number order from the start position at the sound recording, and these program numbers indicate the music numbers at the head position searching.

In this case, the subcode signals 102, 103 and 104 are recorded for each piece of music, and a delimiter among the pieces of music can be instructed from the operational part 27. However, usually, a no-signal state among the pieces of music is detected and, when this no-signal time is more than a predetermined time length, the subcode signals 102,103 and 104 are written in the head of the data to be recorded following the no-signal time, and the program number 104 is consecutively incremented by one.

In FIG. 4, an area 200 shows a TOC signal area, and one preferable embodiment of the present invention is shown. Data 201 to be recorded in the PCM area are the audio TOC signal input from a microphone terminal 21, which is the feature of the present invention. As described above, according to the present invention, by recording the table of contents of the data recorded on the magnetic tape in the PCM area using the audio signals, a user can write the table of contents on the magnetic tape itself without making a note of the contents in another note book or-card. As a result, by an extremely simple operation the data and the table of contents can be integrally recorded on the magnetic tape. Further, such an integral recording, for example, can be readily carried out in a digital magnetic tape recording and reproducing apparatus mounted in an automobile during the driving of the automobile.

According to the present invention, in order to write the TOC signal in the PCM area using the audio signal, the TOC button 48 provided on the operational part 27 is operated to write a reproduction skip code signal 202 in the subarea.

That is, according to the present invention, by the on operation of the TOC button 48, first, the reproduction skip code signal 202 is written on the magnetic tape, and then usual reproduction of the following data is skipped or stopped. Next, in the usual reproduction stop or skip state, the user spontaneously records the TOC signals, for example, "the first music title A", "the second music title B", "the third music title C" and the like on the magnetic tape using the audio sound input from the microphone terminal 21 to form the table of contents of the data successively recorded on the magnetic tape.

Figure 5:
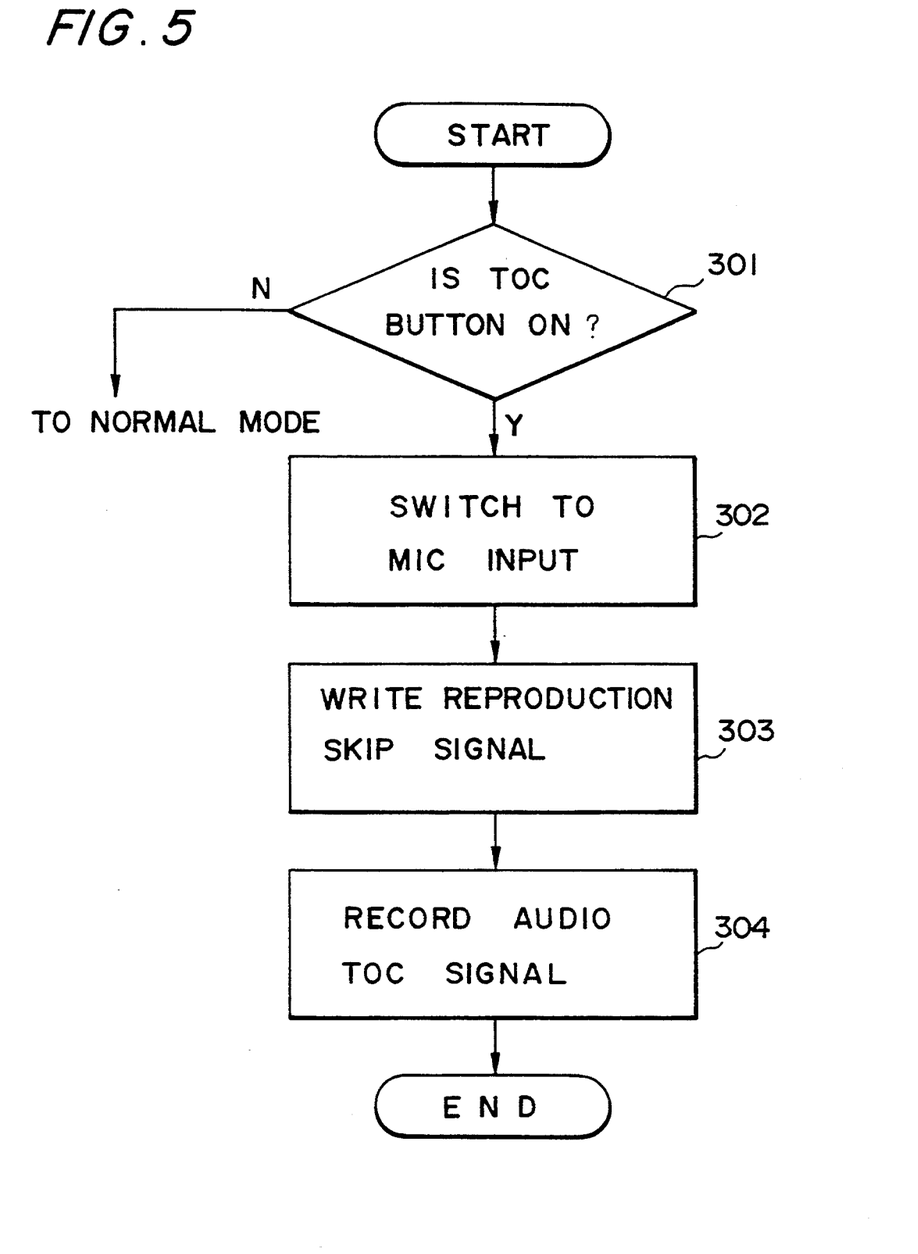
FIG. 5 is a flow chart showing a sound recording state of a TOC signal in one embodiment of a method according to the present invention.

In FIG. 5, there is shown a flow chart of the above-described embodiment according to the present invention. When the TOC button 48 is operated to the on-position in the recording mode in step 301, the data input is switched to the input from the microphone terminal 21 in step 302. Further, at the same time, the reproduction skip code signal is written in the subarea in step 303. As described above, after the preparation for the TOC signal recording is performed, the user can write the desired TOC signals on the magnetic tape using the audio sound input from the microphone terminal 21 in step 304.

As described above, according to the present invention, since the TOC signals are recorded on the magnetic tape as an audio signal, the user does not need the particular card for recording the table of contents and can also readily read the reproduced contents of the audio signal from the magnetic tape, That is, in this present embodiment, by selecting a combination of the reproducing button 44 and the TOC button 48, the TOC signal area 200 can be extremely easily reproduced from the magnetic tape by using the reproduction skip code signal 202 as a guide mark. Thus, while listening to the reproduced contents, the recorded contents of the magnetic tape can be readily known. Hence, as described above, this is extremely suitable for the digital magnetic tape recording and reproducing apparatus mounted in the automobile.

Further, at the usual reproducing, due to the presence of the reproduction skip code signal 202, the TOC signal area 200 thereafter is skipped or its reproduction is stopped. As a result, at the usual data reproducing, as there is no need to have any knowledge of the table of contents, any TOC signal represented as an audio signal is not a nuisance to the operation.

In general, although the reproduction skip code signal 202 can automatically perform the skipping of the TOC signal at the usual reproducing time, the mode can be determined in advance so that the skipping of the TOC signal may be performed only when the reproduction is carried out in the state that the skip mode of the TOC signal is selected. In this case, at the usual reproducing, listening to the table of contents is made possible.

According to the present invention, the TOC signal area 200 is preferably recorded in the remaining area of the recording of the magnetic tape, and generally, when the music or the like is recorded on the magnetic tape, the remaining area is produced at the recording end. That is, a conventionally unused area of the magnetic tape can be effectively used.

Of course, in the present invention, the recording area of the TOC signals can be set in the middle of the tape if necessary, as well as at the last remaining area.

Figure 6:
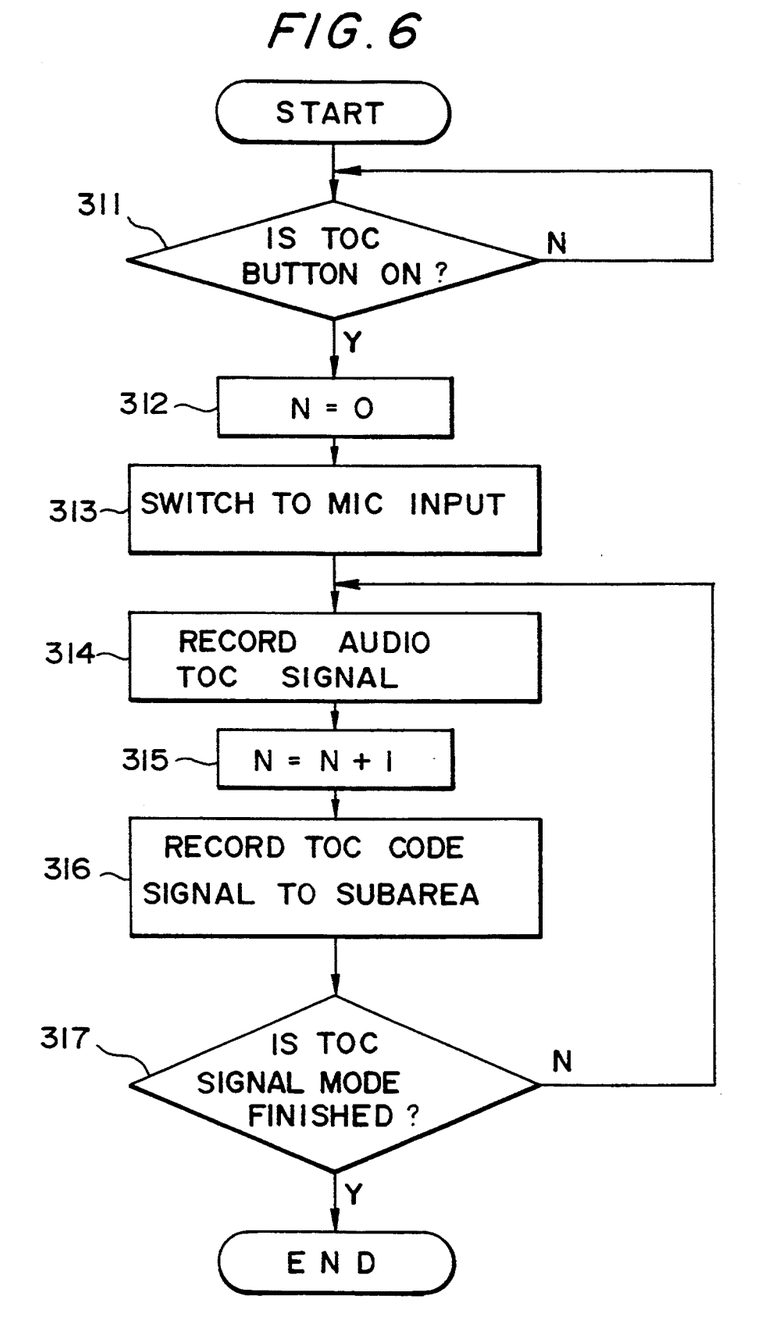
FIG. 6 is a flow chart showing an operation of digital signal recordings of an audio TOC signal and a TOC code signal corresponding thereto in a subarea in another embodiment of a method according to the present invention.

FIG. 6 shows a flow chart of anther embodiment of a method according to the present invention. In this embodiment, different from the above-described first embodiment, no recording of a reproduction skip code signal is carried out. However, the TOC signals are recorded as audio signals, and at the same time, TOC code signals corresponding to the TOC signals are recorded in the subarea corresponding to the PCM area where the TOC signals are written.

In FIG. 4, in this embodiment, a program number 203 in the TOC signal area 200 is one example of the TOC code signal, and during the writing of the audio TOC signal in the PCM area, the program number is written in the subarea corresponding to the PCM area.

Of course, according to the present invention, although the TOC code signals such as the program number and the like can be written at the data head position such as only the initial 300 frames of the head of each audio TOC signal, by recording the TOC code signals in the subarea throughout the whole period of the TOC signals, a selection search hereinafter described in detail can be performed in one touch as it is not necessary to find the head position.

As described above, according to the present invention, by carrying out the writing of the TOC signals in the PCM area using the audio signal and the TOC code signals corresponding to the TOC signals in the subarea, as described above, advantages can be obtained. For example, the table of contents can be written on the magnetic tape itself to expand its utility, and the desired pieces of music can be selected from the TOC code signals in one touch while the table of contents is heard by using the TOC code signals as hereinafter described.

In FIG. 6, there is shown the flow chart of the operation for performing the writing of the audio TOC signals in the PCM area and the TOC code signals in the subarea at the same time. As is apparent from FIG. 4, although the program numbers to be written in the subarea are arranged in an increasing number order in the usual recording, in this embodiment, however, when the on operation of the TOC button 48 is performed in step 311, the program number N increased one by one is restored to zero in seep 312. Then, in the same manner as shown in FIG. 5, the data input is switched to the input from the microphone terminal 21 in step 313. In this embodiment, next, the recording of the TOC signal as an audio signal is carried out in step 314, and at the same time, the increment of the program number N is performed at the start of recording of the TOC signal in step 315. The program number increased by one is recorded in the subarea as the TOC code signal in step 316. After the recording of each TOC signal is finished in step 317, the recording of the next TOC signal as an audio signal and the TOC code signal in the subarea is successively repeated.

As described above, when the writing of the TOC signals in the TOC signal area 200 and the digital recording of the TOC code signals in the subarea are carried out, during the reproducing in the TOC signal area 200, by the operation of the predetermined button, for example, the memory button 47, the TOC code signals can be recorded in the program memory. According to the present invention, when the table of contents of the digital magnetic tape is reproduced, by such a simple operation, the TOC code signals can be read out and stored in the program memory.

Figure 7:
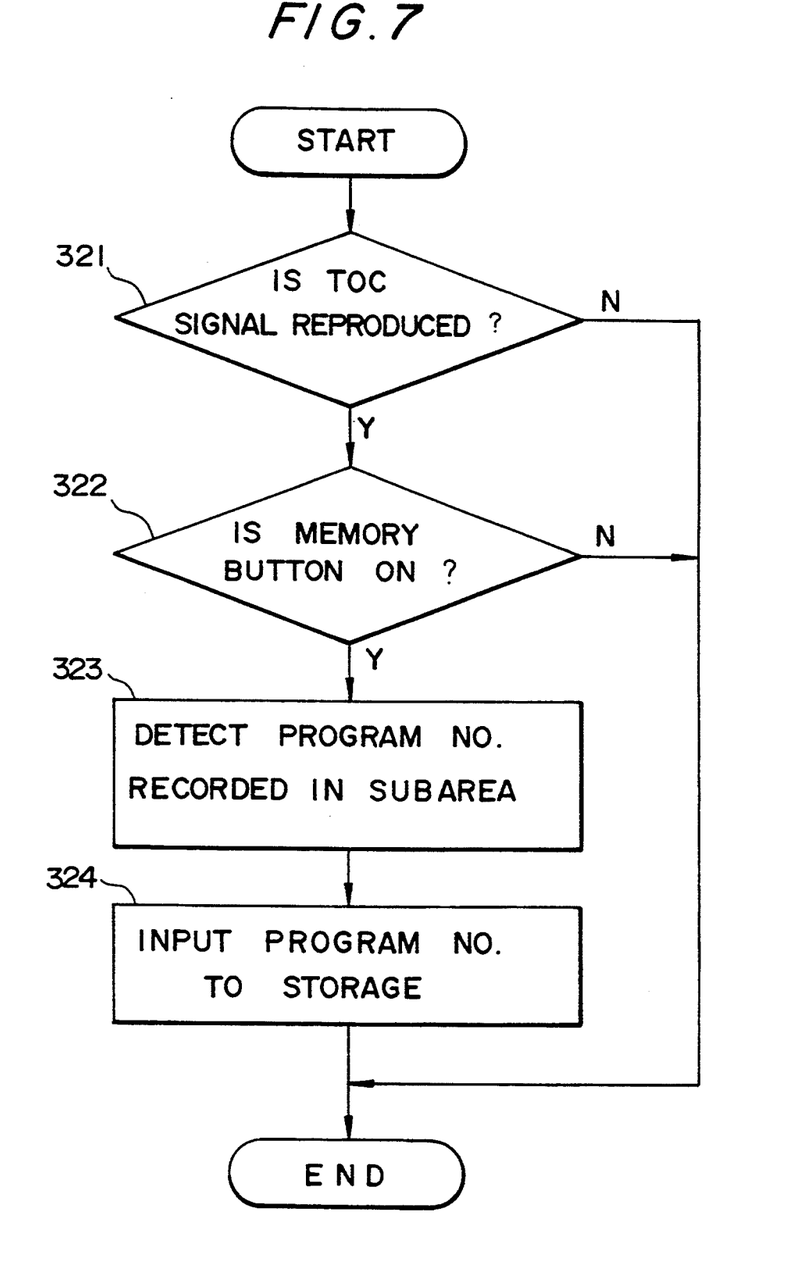
FIG. 7 is a flow chart showing an operation of a detection of a TOC code signal during a TOC signal reproduction and a storing of the same into a program memory in a method according to the present invention.

In FIG. 7, there is shown a flow chart showing a recording of the TOC code signals in the memory. That is, when reproducing the TOC signal in step 321, when the memory button 47 is operated in step 322, during the reproduction of the TOC signal as an audio output, that is, while the user listens to the table of contents, the TOC code signal recorded in the subarea, that is, the program number, is detected in step 323, and the system control circuit 15 feeds the program number detected in the subcode detection section 36 to the program memory of the storage part 28 in step 324.

Hence, while listening to the table of contents, the user can select only favorite pieces of music from the magnetic tape to readily construct a reproduction program. As described above, during the writing of the audio TOC signals 201 shown in FIG. 4 in the PCM area, the program numbers 203 corresponding to the TOC signals are successively written in all frames, and thus the program numbers can be stored in the program memory by operating the memory button 47 in any place during the audio reproduction. Further, as described above, since the program numbers 203 are consecutively recorded as a successive number array increased one by one from the newly reset state in the TOC signal area 200, the music names in the usual data recording area 100 can be allowed to completely correspond to the program numbers. When the magnetic tape is reproduced by using the constructed reproduction program, searching for the desired music head can be precisely performed.

Figure 8:
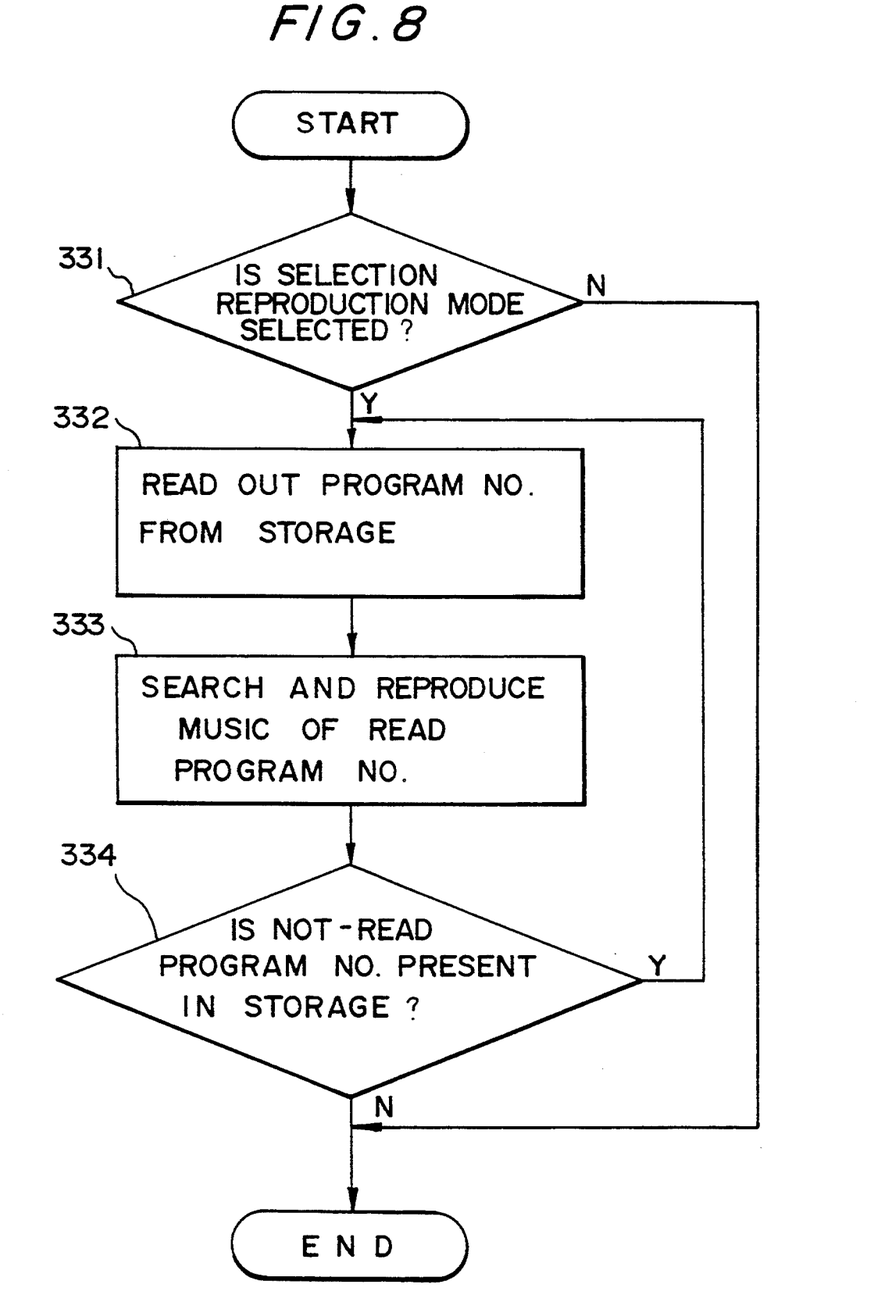
FIG. 8 is a flow chart showing an operation of the successive reading of music titles stored in a program memory and a continuous head searching and reproducing of the music in a method according to the present invention.

FIG. 8 shows a flow chart of an operation for automatically successively reproducing a plurality of pieces of music stored in the program memory of the storage part 28 as described above. In this case, when the selection reproducing mode is selected in step 331, the first or designated piece of music stored in the program memory of the storage part 28 is read out in step 332, and this music is searched at high speed to start the reproduction of the music in step 333. In this manner, the successively programed pieces of music are consecutively searched at high speed and are reproduced in step 334, and thus the selection reproduction can be successively performed by a simple operation.

Next, in the reproducing system according to the present invention, the TOC signals are written in the predetermined PCM area as an audio signal, as described above, and in the reproducing of the magnetic tape storing the TOC code signals corresponding to the TOC signals in the subarea corresponding to the PCM area, by operating the search buttons 45 and 46, the data designated by the TOC code signal are directly searched at high speed and the reproduction of the data can be started. For instance, when in the middle of the reproduction of the musical data, while listening to the table of contents of the music titles, by operating the search button 45 or 46 at the time the desired music title is called, the system control circuit 15 performs a high speed search of the magnetic tape 10 by using the program number detected by the subcode detection section 36, and the data head position searching of the searched music is automatically performed to subsequently carry out the reproduction of the music.

Accordingly, even in the digital magnetic tape recording and reproducing apparatus mounted in the automobile, while listening to the table of contents, the desired piece of music can be selected by the simple one touch operation.

Figure 9:
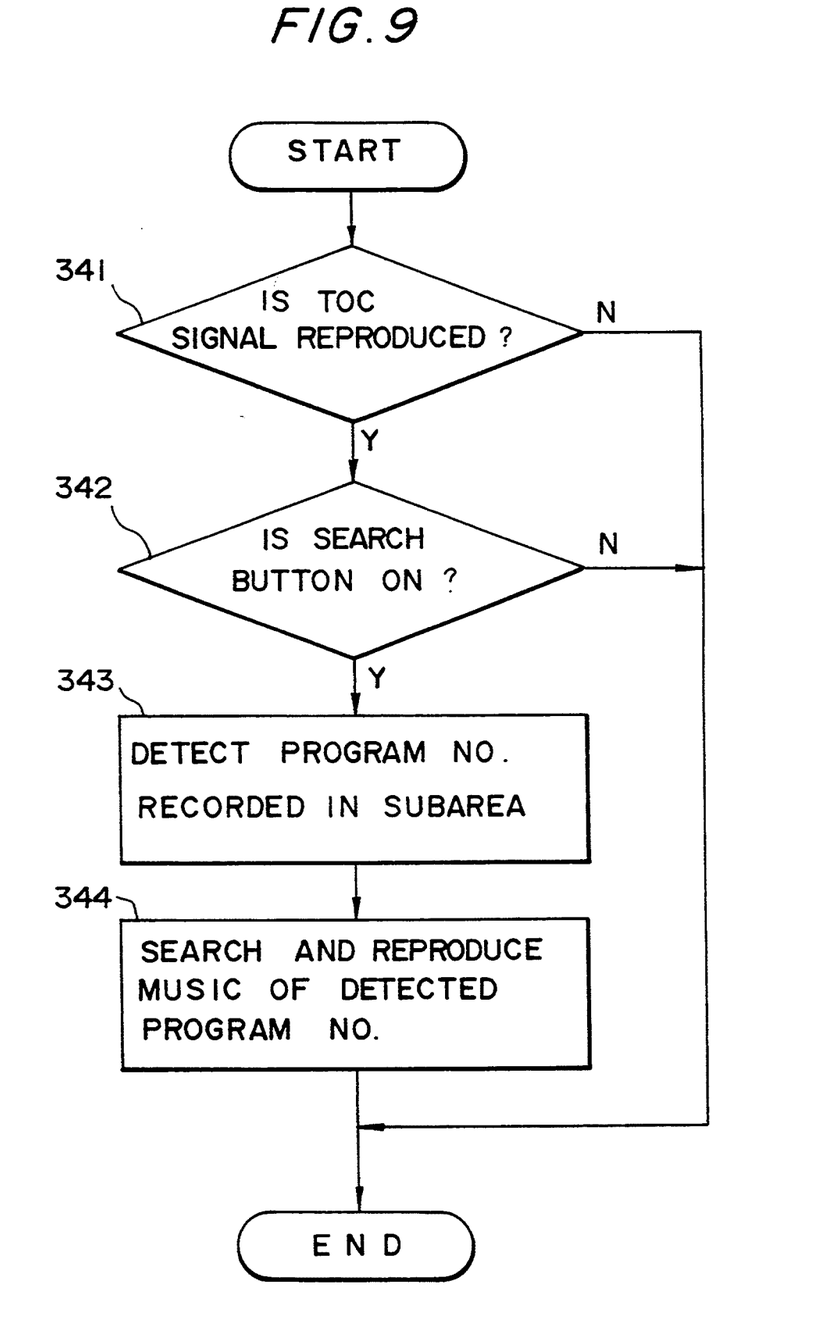
FIG. 9 is a flow chart showing an operation of a program number detection and a head searching and reproducing of the music in a method according to the present invention.

In FIG. 9, there is shown a flow chart of an operation for this case. In this case, during the reproducing of the TOC signal in step 341, when the search button 45 or 46 is operated in step 342, the TOC code signal recorded in the subarea at this time or the program number is detected in step 343. Then, the system control circuit 15 performs a high speed search of the magnetic tape 10 by using the program number detected by the subcode detection section 36, and the searched music is automatically reproduced in step 344. Hence, in the digital magnetic tape recording and reproducing apparatus mounted in the automobile, while listening to the table of contents of the music titles, the driver can perform the selection of the desired pieces of music with a simple operation.

According to the present invention, the recording of the TOC signals as an audio signal is carried out, as described above. At this time, as shown in FIG. 4, prior to a recording of audio TOC signals 204 and 205, by operating the TOC button 48, the recording of the start code signal 102 and the preference level code signal 103 can be preferably stopped. That is, as described above, when the reproduction skip code signal 202 is written by operating the TOC button 48, the reproduction of the following TOC signal area 200 is skipped or stopped. However, in the present invention, such a reproduction skip code signal 202 is not always necessary, and at this time, usually, the TOC signal area 200 is successively reproduced in the reproducing mode. As a result, the system control circuit 15 consecutively performs the increment of the program number by the combination of the start code signal 102 and the program number 104, and this is displayed on the display part 41. Hence, when the tape is wound back to the usual data recording area 100 from the TOC signal area 200, the program numbers can not correspond to the music numbers in the next reproduction, and accordingly the next music selection can not be correctly carried out.

In this embodiment, in order to prevent this problem, as shown in FIG. 4, by stopping the recording of at least the start code signal 102 in the TOC signal area 200, the increment of the program music can not be carried out during the reproduction of the TOC signal area 200, and the displaying of this can be also stopped. Hence, in this embodiment, the aforementioned disorder of the music numbers in the reproducing and recording will not be caused.

In the above-described embodiments, although the program numbers 203 to be recorded in the subarea are automatically incremented or decremented by one every predetermined no-operation time during the writing of the audio TOC signal while observing the delimiter of the audio TOC signals, according to the present invention, since the operational part 27 includes the numerical keys 50, the user can freely input the designated program number from the numerical keys 50, and thus the desired program editing can be performed.

As described above, according to the present invention, in the digital magnetic tape recording and reproducing apparatus such as the R-DAT, the table of contents of the music titles or the like can be recorded on the magnetic tape itself using an audio signal, and the TOC code signals can be written in the subarea, if necessary.

Hence, the user can exactly control the contents of the magnetic tape by using only the magnetic tape without writing the table of contents on a particular note or card.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A recording method for recording a table of contents (TOC), in a digital magnetic tape apparatus, in which a head performs a helical scan of a magnetic tape to form tracks and each track includes a pulse code modulation (PCM) area for recording digital data and a subarea for recording a digital subcode signal representing information about the digital data, comprising the steps of:

writing a reproduction skip signal in subarea, in response to activation of a TOC button, to thereby inhibit reproduction of signals recorded in a subsequently consecutive area of the tape during a normal reproduction of the recorded digital data; and recording a TOC signal in the PCM area, on a consecutive area of the tape subsequent to the written reproduction skip signal, by audio input.

2. The recording method of claim 1, wherein the TOC signal is recorded in a remaining area of the tape, subsequent the digital data recorded on the magnetic tape.

3. A recording method for recording a table of contents (TOC) in a digital magnetic tape apparatus, in which a head performs a helical scan of a magnetic tape to form tracks and each track includes a pulse code modulation (PCM) area for recording digital data and a subarea for recording a digital subcode signal representing information about the digital data, comprising the steps of:

writing a TOC signal in a PCM area as an audio signal, in response to activation of a TOC button; and writing a TOC code signal, corresponding to the written TOC signal, in the subarea corresponding to the PCM area in which the TOC signal is written.

4. The recording method of claim 3, wherein the TOC signal is recorded in a remaining area of the tape, subsequent to the digital data recorded on the magnetic tape.

5. The recording method of claim 3, wherein successive program numbers to be recorded as TOC code signals in subareas are initialized in response to activation of the TOC button, and the program numbers are recorded as new successive number TOC code signals.

6. The recording method of claim 3, wherein each TOC code signal is input in response to activation of numerical keys.

7. A reproducing method for reproducing a table of contents (TOC), in a digital magnetic tape apparatus, in which a head performs a helical scan of a magnetic tape to form tracks and each track includes a pulse code modulation (PCM) area for recording digital data and a subarea for recording a digital subcode signal representing information about the digital data, comprising the steps of:

writing a TOC signal in a predetermined PCM area as an audio signal in response to activation of a TOC button and subsequent audio input; and storing a TOC code signal in a program memory of the digital magnetic tape apparatus in response to activation of a memory button during reproduction of a magnetic tape part, wherein the TOC code signal stored in the program memory is the one corresponding to the TOC signal being reproduced at the time of activation of the memory button, which was previously written in the subarea corresponding to the PCM area containing the reproduced TOC signal.

8. A reproducing method for reproducing a table of contents (TOC), in a digital magnetic tape apparatus, in which a head performs a helical scan of a magnetic tape to form tracks and each track includes a pulse code modulation (PCM) area for recording digital data and a subarea for recording a digital subcode signal representing information about the digital data, comprising the steps of:

writing a TOC signal in a predetermined PCM area as an audio signal in response to activation of a TOC button and subsequent audio input; and performing a high speed search for a data area designated by a TOC code signal, and reproducing the searched data, in response to activation of a search button during reproducing of the TOC, the searched data including the TOC code signal being written in the subarea corresponding to the PCM area in which the TOC signal, being reproduced at the time the search button is activated, is written.

9. A recording method for reproducing a table of contents (TOC), in a digital magnetic tape apparatus, in which a head performs a helical scan of a magnetic tape to form tracks and each track includes a pulse code modulation (PCM) area for recording digital data and a subarea for recording a digital subcode signal representing information about the digital data, comprising the steps of:

writing a TOC signal in a predetermined PCM area as an audio signal in response to activation of a TOC button and subsequent audio input; and inhibiting a recording of a start code signal during the writing of the TOC signal in the PCM area.

10. A method for recording and reproducing a table of contents (TOC) of a magnetic tape, corresponding to digital data recorded in first areas of tracks on the magnetic tape, each track including a corresponding subarea, comprising:

(a) receiving indication of activation of a first switch;

(b) writing a first code signal, in a subarea of the magnetic tape corresponding to a first area containing no digital data recorded in response to the received indication of step (a);

(c) enabling an audio input device in response to the writing of step (b);

(d) receiving sequentially input TOC audio data entries through said enabled audio input device, the TOC audio data entries corresponding to the recorded digital data; and (e) storing the received TOC audio data entries as a TOC of the digital data recorded on the tape.

11. The method of claim 10, further comprising the step of:

(f) storing a program number count, sequentially incremented, one for each sequentially received TOC audio data entry, in a subarea corresponding to a first area where each sequentially received TOC audio data entry is stored.

12. The method of claim 10, further comprising the steps of:

(f) inputting a program number count, through activation of a numerical keypad switch, subsequent to each sequentially received TOC audio data entry; and (g) storing each input program number count in a subarea corresponding to a first area where each sequentially received TOC audio data entry is stored.

13. The method of claim 10, wherein the first switch of step (a) is a TOC button, and the first code signal is a skip code signal inhibiting reproduction of subsequently stored signals during a normal reproduction mode wherein the recorded digital data area reproduced.

14. The method of claim 10, wherein the recorded digital data are musical songs and each TOC audio data entry includes a title corresponding to a recorded musical song.

15. A method of recording an reproducing a table of contents (TOC) of a magnetic tape, corresponding to digital data recorded in first areas of tracks on a the magnetic tape, each track including a corresponding subarea, comprising:

(a) receiving indication of activation of a first switch;
(b) initializing a program number counter in response to the received indication of step (a);
(c) receiving a sequentially input TOC audio data entry, through an audio input device;
(d) recording the sequentially input TOC audio data entry in a first area of a track on the magnetic tape;
(e) incrementing the program counter;
(f) storing an incremented program number count in a subarea corresponding to the first area of the sequentially input TOC audio data entry; and
(g) repeating steps (c)–(f) until a TOC of the recorded digital data is stored.

16. The method of claim 15, wherein the first switch of step (a) is a TOC button.

17. The method of claim 15, wherein the recorded digital data are musical songs and each TOC audio data entry includes a title corresponding to a recorded musical song.

18. The method of claim 15, further comprising the steps of:

(f) receiving indication of a second activation of the first switch;
(g) receiving indication of activation of a second switch, nearly simultaneous to the second activation of the first switch in step (f); and
(h) outputting, sequentially, each of the stored TOC audio data entries.

19. The method of claim 15, wherein the output of step (h) is a visual output.

20. The method of claim 15, wherein the output of step (h) is an audio output.

21. The method of claim 15, wherein the first switch is a TOC button and the second switch is a PLAY button.

22. The method of claim 15, further comprising the steps of:

(i) receiving indication of activation of a third switch; and
(j) storing the program number count in a memory, corresponding to the sequentially output TOC audio data entry, in response to the received indication of step (i).

23. The method of claim 22, wherein the third switch is a MEMORY button.

24. The method of claim 22, further comprising the steps of:

(k) repeating steps (i) and (j) for each activation of the third switch, to sequentially store, in memory, program number counts for a plurality of output TOC audio data entries.

25. The method of claim 24, wherein a program number count, matching the program number count of a corresponding TOC audio data entry, is stored in a subarea corresponding to a first area wherein digital data are recorded.

26. The method of claim 25, further comprising the steps of:

(l) receiving indication of a second activation of the second switch;
(m) outputting, sequentially, a stored program number count from the memory;
(n) detecting the subarea on the magnetic tape containing a program number count matching the output program number count of step (m);
(o) outputting the digital data stored in a first area of the magnetic tape corresponding to the subarea of the detected program number count of step (n); and
(p) repeating steps (m)–(o) for each of the program number counts stored in the memory.

27. The method of claim 18, further comprising the steps of:

(i) receiving indication of activation of a third switch;
(j) outputting the stored digital data corresponding to the last sequentially output TOC audio data entry of step (h) in response to the received indication of step (i).

28. The method of claim 27, wherein the third switch is a SEARCH button.

29. The method of claim 10, further comprising the steps of:

(f) receiving indication of a second activation of the first switch;
(g) receiving indication of activation of a second switch, nearly simultaneous to the second activation of the first switch in step (f); and
(h) outputting, sequentially, each of the stored TOC audio data entries.

30. The method of claim 29, wherein the output of step (h) is a visual output.

31. The method of claim 29, wherein the output of step (h) is an audio output.

32. The method of claim 15, wherein the first switch is a TOC button and the second switch is a PLAY button.

33. The method of claim 29, further comprising the steps of:

(i) receiving indication of activation of a third switch;
(j) outputting the stored digital data corresponding to the last sequentially output TOC audio data entry of step (h) in response to the received indication of step (i).

34. The method of claim 33, wherein the third switch is a SEARCH button.

35. The method of claim 27, wherein the stored digital data output in step (j) is a musical song.

36. The method of claim 33, wherein the stored digital data output in step (j) is a musical song.

* * * * *